United States Patent [19]
Mitchell, Jr. et al.

[11] 3,922,315
[45] Nov. 25, 1975

[54] PROCESS FOR THE PREPARATION OF NITROAROMATIC COMPOUNDS

[75] Inventors: Maurice M. Mitchell, Jr., Wallingford; Edward S. J. Tomezsko, Media, both of Pa.

[73] Assignee: Atlantic Richfield Company, Los Angeles, Calif.

[22] Filed: Oct. 26, 1973

[21] Appl. No.: 409,981

[52] U.S. Cl.................................. 260/645; 260/580
[51] Int. Cl.² ........................................ C07C 79/10
[58] Field of Search ..................................... 260/645

[56] References Cited
OTHER PUBLICATIONS
Urbanski, Chemistry and Technology of Explosives, Vol. I, The MacMillion Co., New York, 1964, pp. 90 to 92.

*Primary Examiner*—Leland A. Sebastian
*Attorney, Agent, or Firm*—Delbert E. McCaslin

[57] ABSTRACT

Process for the mononitration of aromatic compounds through the use of nitrogen dioxide and/or its dimer, nitrogen tetroxide, in the presence of a rhodium catalyst. Also, by suitable adjustment of operating parameters the corresponding amino compound may be made from the produced nitro compound using the same contained rhodium catalyst.

8 Claims, No Drawings

PROCESS FOR THE PREPARATION OF NITROAROMATIC COMPOUNDS

BACKGROUND OF THE INVENTION

The nitration of aromatic compounds such as benzene, toluene, xylenes, naphthalene, etc. with a mixture of concentrated nitric acid and sulfuric acid (as catalyst) or with fuming nitric acid (which also oxidizes side chains) are the classical methods which have been exhaustively studied and are taught in elementary organic chemistry. The isomerization of multi-substituted aromatics in such strong acid systems is equally well known. For example, the nitration of pure para-xylene under these usual conditions will produce a nitrated product wherein the methyl groups have migrated to approach equilibrium distribution among the three xylene isomers.

The use of nitrogen dioxide, $NO_2$, or its equivalent, nitrogen tetroxide, $N_2O_4$, as the nitration agent of aromatic species has not been widely known or used. For example, in U.S. Pat. No. 3,061,404 to Bachman et al the nitration was effected by first forming a complex of $NO_2$ ($N_2O_4$) with $BF_3$. This complex was then added to the aromatic to be nitrated which was kept at relatively low temperatures (ambient or less) for a week, in the given example of benzene, to produce a 39 per cent yield of nitrobenzene. Alternatively, both $BF_3$ and the $NO_2$—$N_2O_4$ gases were passed through a solution of the aromatic compound at ambient temperatures to obtain the nitration. Solvents for this method include $CH_3NO_2$, $CHCl_3$, $CCl_4$ and similar solvents. Thus naphthalene was nitrated by this method to a mixture of 1,5 and 1,8 dinitronapthalenes in a 65 per cent yield based on naphthalene.

In a second patent, U.S. Pat. No. 3,459,816 to W. A. Pritchett only side chain nitration was obtained. With para-xylene, $\alpha,\alpha'$-dinitro-para-xylene was obtained by the reaction of $N_2O_4$ with para-xylene using trichlorotrifluoroethane as the solvent at 140°C. under autogenous pressure. Pressures ranging up to 500 psig were reached while temperatures were held below 160°C.

The use of rhodium complexes of the type $RhXL_3$ wherein X is a halogen and L is triarylphosphine as hydrogenation catalysts is well known and is described both in the patent literature and technical literature, see, for example, the papers of G. Wilkinson in J. Chem. Soc., London (1966–67).

The process of the instant invention employs $NO_2$—$N_2O_4$ in conjunction with a rhodium catalyst of the type described to produce the mono nitroaromatic compounds and thus has many advantages over the processes of the described prior art. The instant process completely voids the use of acids of any type including nitric and sulfuric or fuming nitric acid thereby avoiding all of the inherent risks in the use of such compounds. In addition the instant process permits selective nitration without the risk of ring isomerization in the case of alkylated aromatic compounds and also avoids other acid catalyzed side reactions. The method provides a reaction system that is amenable to the substantial complete recovery of both products and unreacted reagents with a minimum of difficulty. The method gives only the desired mono-nitroaromatics. The amount of catalyst required is not stoichiometric with the $NO_2$ (as in U.S. Pat. No. 3,061,404, supra) or with the aromatic reactant. A solvent is not required. Thus the instant process not only provides advantages with respect to safety, but also with respect to ease of handling reagents, ease of recovery of both product and unreacted reagents and the use of a minimum number of compounds in the reaction.

SUMMARY OF THE INVENTION

In accordance with the instant invention the rhodium catalyst is dissolved in the aromatic compound or aromatic compound plus solvent if one is employed and the system purged of air, then saturated with hydrogen and heated to reaction temperature. The next step consists of contacting the solution with $NO_2$—$N_2O_4$ gas, either by bubbling it into and through the solution or pressurizing it over the solution or using equivalent means of contacting the solution with gas. The solution is kept saturated with hydrogen during this step and a stoichiometric excess of $NO_2$—$N_2O_4$ is always maintained in contact with the reaction mixture.

In an alternative method, after the hydrogen has been added to the catalyst-aromatic solution, the $NO_2$—$N_2O_4$ is added and the system sealed. Thereafter it is immediately brought to reaction temperature and held at such temperature until the reaction is completed. It is preferable in such method to employ excess $NO_2$—$N_2O_4$ so that none has to be added.

In an additional embodiment of the invention after the nitroaromatic compound is produced the system is swept free of $NO_2$ with hydrogen and left saturated with excess hydrogen. It is again brought to reaction temperature and the nitroaromatic compound is reduced to the corresponding aromatic amine.

Quantitative yields based on the aromatic compound are obtainable by the method of this invention.

It is an object of this invention, therefore, to provide a method for the production of nitroaromatic compounds.

It is another object of this invention to provide a method for the production of nitroaromatic compounds without the use of acids either as reagents or catalysts.

It is another object of this invention to provide a method for the production of nitroaromatic compounds employing nitrogen-dioxide-nitrogen tetroxide gas as the nitrating agent in the presence of a rhodium catalyst.

It is another object of this invention to provide a method for the production of nitroaromatic compounds and their corresponding aromatic amines.

Other objects of this invention will be apparent from the following detailed description of the invention and from the claims.

DESCRIPTION OF THE INVENTION

The catalysts suitable for use in this invention are preferably the tris-triarylphosphine-halorhodium (I) compounds. They are characterized by having the general formula $RhX[PAr_3]_3$ where X is a halogen atom and Ar is an aryl group. The halogen is preferably chloro or bromo. The aryl group is preferably phenyl since this is the simplest group, however, the aryl group can also be (besides phenyl), p-tolyl, o-tolyl, m-tolyl, ethylphenyl, methoxyphenyl, chlorophenyl, etc. The triarylphosphine can be a mixture of these aryl groups, as well as all of the same species.

There are no known limitations to the aromatic compounds which may be nitrated by the method of this invention, however, it is particularly suitable for nitrating benzene, alkylated benzenes or other substituted benzenes, naphthalene, substituted naphthalenes and similar aromatics.

In the instant process it is preferred to use the aromatic to dissolve the catalyst, for example, the tris-triphenylphosphine-chlororhodium (I). A solvent can be used, for example, chloroform, carbon tetrachloride, nitromethane or the like, but such solvent is not necessary.

The solution of aromatic compound and catalyst is brought to reaction temperature with the broad range being from 25°C. to 165°C., with a more preferred range being from 80°C. to 120°C. and a particularly convenient temperature being about 100°C. The low temperatures, of course, are less preferred since they require longer reaction times, and temperatures above 165°C. should not be employed since the catalyst begins to decompose at temperatures above this limit.

The pressure limitations are dictated solely by the practical manipulative procedure desired. For example, a hydrogen pressure of 0.1 to 10 atmospheres may be employed, with from 0.5 to 2 atmospheres being preferred and a pressure of 1 atmosphere being the most preferred.

The catalyst concentration in moles per liter can range from 0.01 to 0.10 with 0.01 to 0.05 being preferred, and concentrations in the middle of this range, for example 0.025 moles per liter is particularly preferred.

The aromatic compound concentration in the liquid medium, for example if a solvent is employed and on a catalyst-free basis, can range from 1 to 100 weight per cent with from 10 to 100 weight per cent being preferred. As has been pointed out, however, it is unnecessary to employ any solvent and therefore the aromatic concentration is most preferably 100 weight per cent.

The reaction time in hours can range from 0.5 to 10 with 0.5 to 2 being preferred and with 1 hour being a particularly convenient time.

Although for convenience in small scale runs, batch procedures are employed, the process is amenable to continuous processing with a constant flow of hydrogen and nitrogen dioxide into the reactor with the entire system, i.e. gas and liquid being in a flow system having sufficient contacting time or holding time to effect continuous processing.

It should also be understood that although the nitrogen dioxide is conveniently used in gaseous form, it is readily liquifiable at ambient temperatures and can be added to the hydrogen saturated aromatic-catalyst solution as a liquid which thereafter can be heated to reaction temperatures.

After the solution of aromatic compound and catalyst is brought to reaction temperature it is then saturated with hydrogen at a pressure within the ranges set forth. Thereafter, the nitrogen dioxide, i.e., $NO_2$—$N_2O_4$ gas is either bubbled into or pressurized over or otherwise contacted with the solution and the solution is kept saturated with hydrogen during this time and an excess of the nitrogen dioxide gas is always kept in contact with the reaction mixture.

During the course of the nitration, initially a yellow solid precipitates from the solution which gradually redissolves and the solution takes on a deep red color of $N_2O_4$. If the gas phase comprising the $NO_2$—$N_2O_4$ is kept at only a slight excess, the solution gradually turns a light yellow.

In a closed volumetic system a pressure drop is observed as the $NO_2$—$N_2O_4$ is consumed. The light yellow solution comprises the active catalyst, the nitroaromatic product and any unreacted aromatic. After sufficient time to complete the reaction, generally as stated above, about 1 hour the system is cooled, the gases are vented and a high yield of the nitroaromatic product is obtained. It has been found that if hydrogen is not present initially the catalyst is destroyed hence it is always necessary before introducing the $NO_2$—$N_2O_4$ gas to saturate the solution with hydrogen as has been described. Likewise if the $NO_2$—$N_2O_4$ gas is not kept in excess during the nitration reaction, reduction of the nitro compound to an amine compound will occur. These two conditions are critical to the invention, i.e. the protection of the catalyst with hydrogen and the use of a stoichiometric excess of the $NO_2$—$N_2O_4$ reagent gas. This provides the additional embodiment of the invention whereby after sufficient reaction of the $NO_2$—$N_2O_4$ gas has occurred sweeping out the gas from the reaction mixture and replacing it either with 100 per cent hydrogen or with dilute hydrogen will effect quantitative reduction of the nitrocompound to the amine if this is the desired end product. The complete absence of $NO_2$ is required and critical.

The following examples are provided to illustrate the invention in additional detail but these are not to be considered as limiting.

EXAMPLE I

In a 10 ml (8.8 g.) portion of benzene 0.23 g. (0.25 millimoles) of tris-triphenylphosphine-chlororhodium (I), $RhCl[P(C_6H_5)_3]_3$ is dissolved. The resulting red solution is placed in a glass vessel which is then purged of air using nitrogen. Hydrogen is admitted until the solution turns clear yellow. Then nitrogen dioxide is injected into the solution until it is saturated (deep red). The system is sealed with one atmosphere of nitrogen dioxide and one atmosphere of hydrogen in the gas over the solution. Immediately the vessel is heated to 100°C. and held there for 1 hour. It is then cooled and the excess $NO_2$ and $H_2$ gases released and excess $NO_2$ is purged from solution. The nitrobenzene produced in 100 per cent yield (based on benzene) is recovered by vacuum distillation. The catalyst remaining in the bottoms from this distillation is recycled.

EXAMPLE II

The same system and procedure as used in Example I is followed, except the excess $NO_2$ in solution is purged with hydrogen and excess hydrogen is kept over the solution while it is reheated to 100°C. In 1 hour analysis of the solution in the vessel shows 40.2 per cent aniline and 59.8 per cent unreduced nitrobenzene. In 4 hours at 100°C. this same solution contains only aniline, in an amount corresponding to the starting benzene, together with the rhodium catalyst.

EXAMPLE III

A 0.25 gram portion of tris-triphenylphosphine-chlororhodium (I) catalyst is dissolved in 10 ml of para-xylene. Following the reaction procedure of Example I the yield of 2-nitro-para-xylene is quantitative. No 1,3- or 1,2-dimethyl derivatives are detected. Recovery of the 2-nitro-para-xylene is affected by dissolving the cooled reaction mixture in ethanol which precipitates the catalyst. The ethanol is then distilled from the 2-nitro-para-xylene product.

EXAMPLE IV

A solution of naphthalene in carbon tetrachloride is prepared to a concentration of 12.8 g. in 100 ml of solution. To 100 ml of this solution is added 0.25 gram of the rhodium catalyst, $RhCl[P(C_6H_5)_3]_3$. Following the procedure of Example III, an 85 per cent yield of α-nitronaphthalene is obtained.

The foregoing Examples demonstrate the utility of the invention for the production of mononitroaromatic compounds utilizing various aromatic compounds and with and without solvents. In order to recover the catalyst after reaction, any low boiling alcohol such as methanol, ethanol or the like or saturated hydrocarbons such as pentane, hexane, cyclohexane and the like in which the desired nitro compound is soluble and the catalyst is insoluble can be used.

The foregoing Examples also show that although a stoichiometric excess of nitrogen dioxide is always employed in accordance with the teachings of this invention the product is the mononitro aromatic and the nitro group is in the same position as would be obtained when using conventional prior art nitration methods employing nitric and sulfuric acids, for example.

It will also be noted that when the aromatic compound being nitrated boils below the temperature employed for the reaction that sufficient pressure is employed to maintain a liquid phase. Such pressure can be obtained by the use of sufficient hydrogen and/or nitrogen dioxide pressure and in the case of closed reactor systems the autogeneous pressure.

Although it is convenient to use the same reaction temperature when converting the nitroaromatic to the corresponding amine as shown in Examples I and II, it is not necessary to use the same temperatures since the same catalyst is employed and therefore temperatures in the same range, i.e., 25°C. to 165°C. can be used.

We claim:

1. A method for the mononitration of aromatic compounds selected from the group consisting of benzene, alkylated benzenes and naphthalene which comprises contacting said aromatic compound in the liquid phase in the presence of hydrogen and a tris-triarylphosphine-halorhodium(I) catalyst with an excess of nitrogen dioxide at a temperature in the range of from 25°C. to 165°C.

2. The method according to claim 1 wherein the halo atom of the catalyst is chlorine or bromine.

3. The method according to claim 2 wherein the aryl group of the catalyst is selected from the group consisting of phenyl, p-tolyl, o-tolyl, m-tolyl, ethylphenyl, methoxyphenyl, chlorophenyl and mixtures thereof.

4. The method according to claim 3 wherein the aryl group is phenyl.

5. The method according to claim 1 wherein the temperature is in the range of from 80°C. to 120°C.

6. The method according to claim 5 wherein said aromatic compound is benzene.

7. The method according to claim 5 wherein said aromatic compound is p-xylene.

8. The method according to claim 5 wherein said aromatic compound is naphthalene.

* * * * *